United States Patent [19]

Tanaka et al.

[11] Patent Number: 5,489,487
[45] Date of Patent: Feb. 6, 1996

[54] CU-PB ALLOY BEARING

[75] Inventors: Tadashi Tanaka; Masaaki Sakamoto; Koichi Yamamoto; Tsukimitsu Higuchi, all of Nagoya, Japan

[73] Assignee: Daido Metal Company Ltd., Nagoya, Japan

[21] Appl. No.: 318,297

[22] Filed: Oct. 5, 1994

[30] Foreign Application Priority Data

Dec. 22, 1993 [JP] Japan .................................. 5-346664

[51] Int. Cl.[6] .................................................. B22F 7/04
[52] U.S. Cl. .......................... 428/548; 428/546; 428/553; 428/457; 384/276; 384/445; 252/12
[58] Field of Search .................................... 428/546, 548, 428/553, 457; 384/276, 445; 252/12

[56] References Cited

U.S. PATENT DOCUMENTS

| | | | |
|---|---|---|---|
| 4,406,857 | 9/1983 | Mahrus et al. | 420/474 |
| 4,832,801 | 5/1989 | Mori | 204/37.3 |
| 4,877,696 | 10/1989 | Muto | 428/645 |
| 4,927,715 | 5/1990 | Mori | 428/645 |
| 4,937,149 | 6/1990 | Mori | 428/645 |
| 5,183,637 | 2/1993 | Tanaka et al. | 420/479 |
| 5,185,216 | 2/1993 | Tanaka et al. | 428/614 |
| 5,195,244 | 3/1993 | Green | 29/898.12 |
| 5,246,509 | 9/1993 | Kato et al. | 148/434 |
| 5,298,336 | 3/1994 | Tanaka et al. | 428/552 |
| 5,328,772 | 7/1994 | Tanaka et al. | 428/548 |
| 5,334,460 | 8/1994 | Tanaka et al. | 428/552 |
| 5,429,876 | 7/1995 | Tanaka et al. | 428/553 |
| 5,434,012 | 7/1995 | Tanaka et al. | 428/643 |
| 5,445,896 | 8/1995 | Tanaka et al. | 428/647 |

FOREIGN PATENT DOCUMENTS 4202726 11/1990 Japan .

*Primary Examiner*—Donald P. Walsh
*Assistant Examiner*—Scott T. Bluni
*Attorney, Agent, or Firm*—Browdy & Neimark

[57] ABSTRACT

A multi-layer bearing consists of a backing steel plate, a layer of Cu—Pb bearing alloy comprising, by weight, 1 to 20% of Ni and containing Pb-phase grains dispersed in the matrix, and an overlay of Pb alloy containing In. In in the overlay is diffused into the Pb-phase grains in the bearing alloy layer and forms a diffusion layer of high corrosion resistance in which In coexists with the Pb-phase grains, in an area of 30 to 200 μm from the interface to the overlay. Even if the overlay is worn and the Cu—Pb bearing alloy layer is exposed, high corrosion resistance will be maintained.

5 Claims, 2 Drawing Sheets

CU-PB ALLOY BEARING

BACKGROUND OF THE INVENTION

The present invention relates to a Cu—Pb alloy bearing and, more particularly, to a Cu—Pb alloy bearing of an excellent corrosion resistance.

Regarding a bearing alloy layer of a Cu—Pb alloy used for an internal combustion engine, Pb-phase grains dispersed in the Cu matrix are readily corroded by acid. Especially in the case of lubrication oil after long-time use (hereinafter referred to as deteriorated oil), acid substances such as an organic acid (R—COOH) changed in quality corrode Pb-phase grains very easily. In order to improve the corrosion resistance, Sn and In are added to the bearing alloy. However, those elements dissolve into the Cu matrix so that the corrosion resistance of Pb-phase grains will not be improved. In this regard, there has been an attempt to substituted Bi (JP-A-4-202726) for Pb improve the corrosion resistance. However, such substitution is not sufficient because the proposed alloys are degraded in conformability and anti-seizure property. Further, in accordance with an increase of the output of an internal combustion engine in recent years, even higher fatigue resistance and higher corrosion resistance have been demanded.

In this regard, there have been known alloy bearings in which an overlay layer made of Pb—Sn, Pb—Sn—Cu or Pb—Sn—In alloy is formed on the bearing alloy layer so as to enhance not only the conformability but also the corrosion resistance. Further, among these alloy bearings including the overlays, there have been known bearings in which an intermediate Ni layer is provided between the bearing alloy layer and the overlay, whereby Sn or In in the overlay is inhibited from diffusing into the bearing alloy during heat treatment and operation of the engine so that some properties including corrosion resistance produced by the overlay will not fail to be produced. However, those of the Cu—Pb alloy bearings which do not include intermediate Ni layers have a problem that when the overlay is worn with long-time use and the bearing alloy layer is exposed, it is directly contacted with deteriorated oil and quickly becomes corroded. On the other hand, those of the Cu—Pb alloy bearings which include intermediate Ni layers have a problem that provision of the intermediate Ni layer increases the costs. Besides, when the overlay becomes worn with long-time use and the hard intermediate Ni layer is exposed, whereby seizure is caused in the internal combustion engine.

SUMMARY OF THE INVENTION

Thus, it is an object of the present invention to provide a Cu—Pb alloy bearing in which an overlay is directly formed on a bearing alloy layer without an intermediate Ni layer, and corrosion resistance of the bearing alloy layer without is still increased in the region on and around the interface to the overlay, so that even if the overlay is worn and the Cu—Pb bearing alloy layer is exposed, high corrosion resistance will be maintained.

According to the invention, a multi-layer bearing consists of a backing steel plate optionally plated with Cu, a layer of Cu—Pb bearing alloy on the backing plate, the bearing alloy layer comprising, by weight, 1 to 20% of Ni and Pb-phase grains dispersed in the matrix, and an overlay of Pb alloy containing In, wherein In in the overlay is diffused into the Pb-phase grains in the bearing alloy layer and forms a layer in which In coexists with the Pb-phase grains in the region of 30 to 200 μm from the interface between the overlay and the bearing alloy layer.

The Cu—Pb bearing alloy layer and the overlay of Pb alloy containing In are formed on the backing steel plate optionally plated with Cu, thereby obtaining a clad plate. The clad plate is subjected to diffusion treatment such that In in the overlay is caused to diffuse into the Cu—Pb bearing alloy. As a result of the diffusion treatment, In is diffused into and coexists with the Pb-phase grains, thereby providing the Pb-phase grains having a high In concentration of 2 to 10%. The Pb-phase grains having a high In concentration are distributed to form a diffusion layer having a thickness of 30 to 200 μm from the interface. Since the In concentration in the Pb-phase grains in the diffusion layer is enhanced, corrosion resistance of the Pb-phase grains is improved.

Therefore, even if the overlay is worn away and the bearing alloy layer is exposed, it will not be corroded rapidly owing to the diffusion layer having an excellent corrosion resistance. That is to say, there can thus be provided a Cu—Pb alloy bearing which is excellent in corrosion resistance over a long time period.

DETAILED DESCRIPTION OF THE INVENTION

Components of a bearing alloy according to the present invention will now be described.

A. Bearing Alloy

1) Ni: 1 to 20 wt %

When the Ni content is less than 1%, an effect of improved corrosion resistance on account of In can not be obtained. In other words, In and Sn diffused from the overlay form a Cu—Sn—In reaction product layer, and consequently, the In concentration in Pb grains can not be enhanced.

Figure 1A:
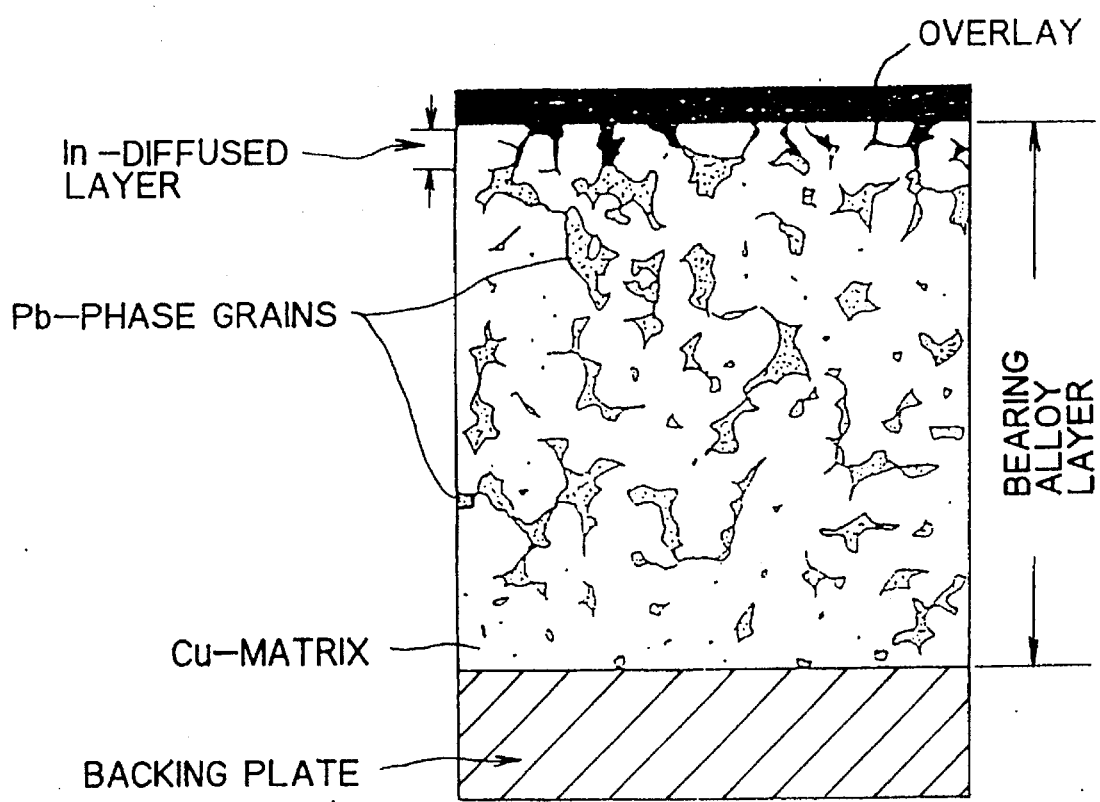
FIG. 1A is an enlarged cross-sectional view showing one part of a comparative example 9.
Figure 1B:
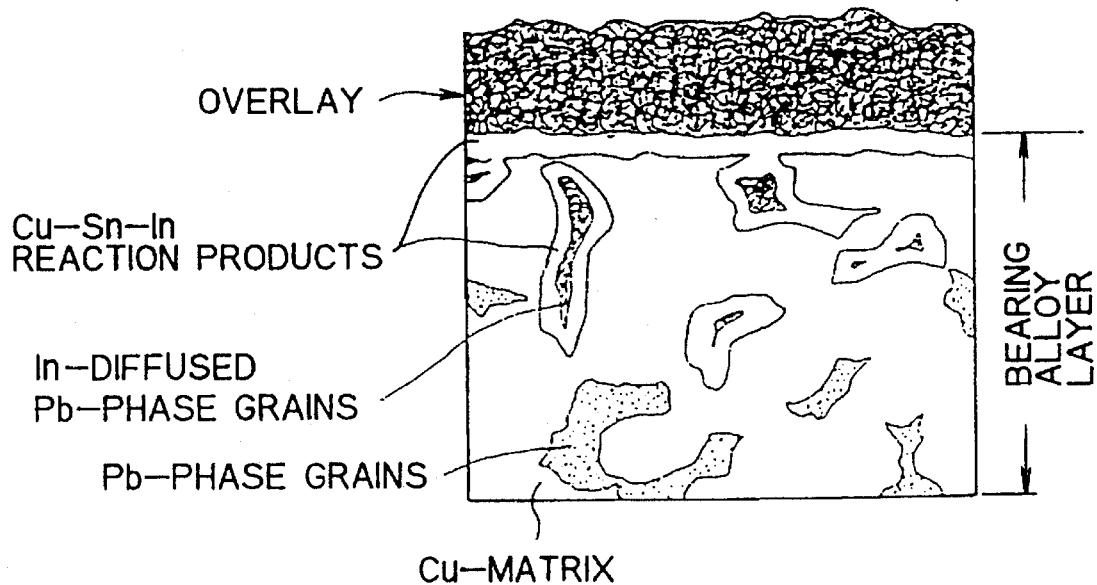
FIG. 1B is a further enlarged cross-sectional view showing one part of FIG. 1A.

FIG. 1A shows a comparative example 9 which does not contain Ni, in a condition after diffusion treatment. In this condition, Sn and In are diffused from the overlay side into a layer of the bearing alloy. A diffusion layer made of Pb-phase grains having an In concentration of 2% or more is as thin as about 20 μm. FIG. 1B is an enlarged view of one part of FIG. 1A, showing that a large thickness of Cu—Sn—In reaction products are formed on the interface between the overlay and the bearing alloy layer and around the Pb-phase grains in the Cu matrix. That is to say, when Sn and In in the overlay diffuse into the bearing alloy layer, the diffused Sn and In are consumed as the Cu—Sn—In reaction products on the interface between the overlay and the bearing alloy layer and around the Pb-phase grains, thereby only forming a thin diffusion layer. Moreover, the In concentration in the Pb-phase grains is not increased. Therefore, corrosion resistance of the Pb-phase grains can not be enhanced.

Figure 2A:
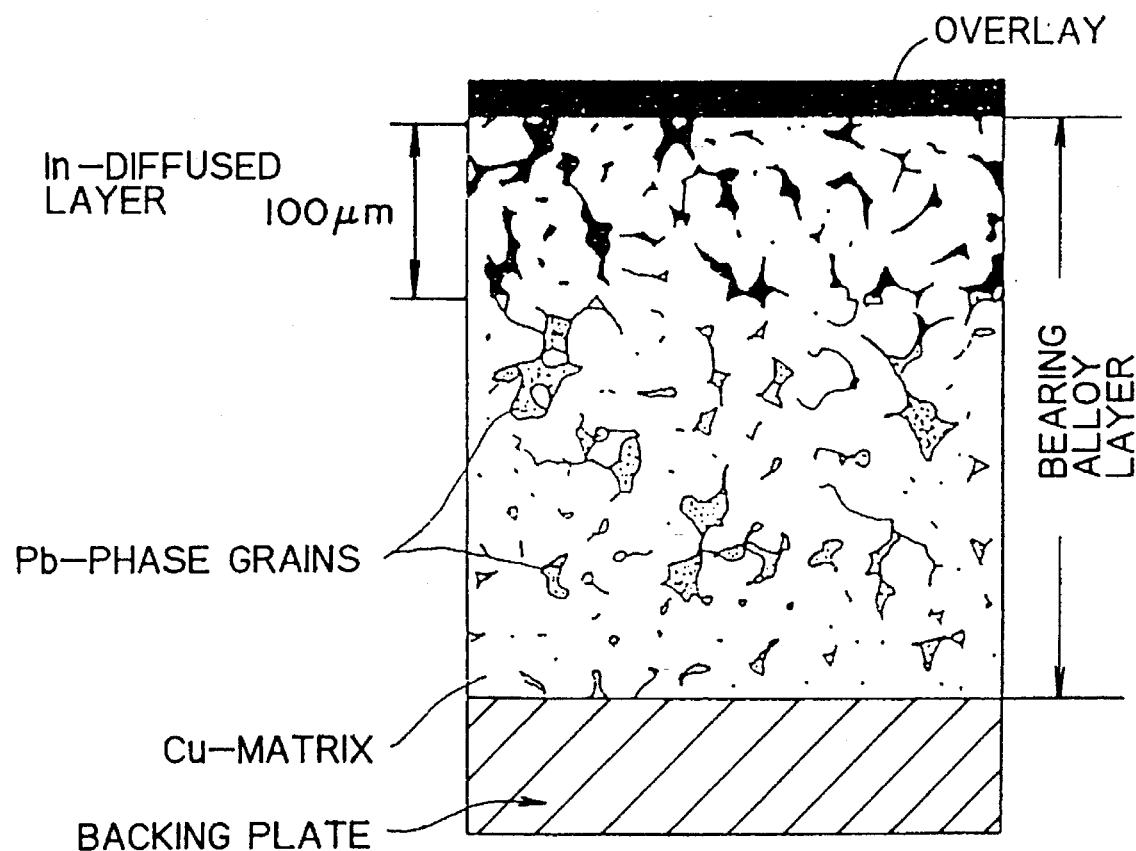
FIG. 2A is an enlarged cross-sectional view showing one part of an invention example 6.
Figure 2B:
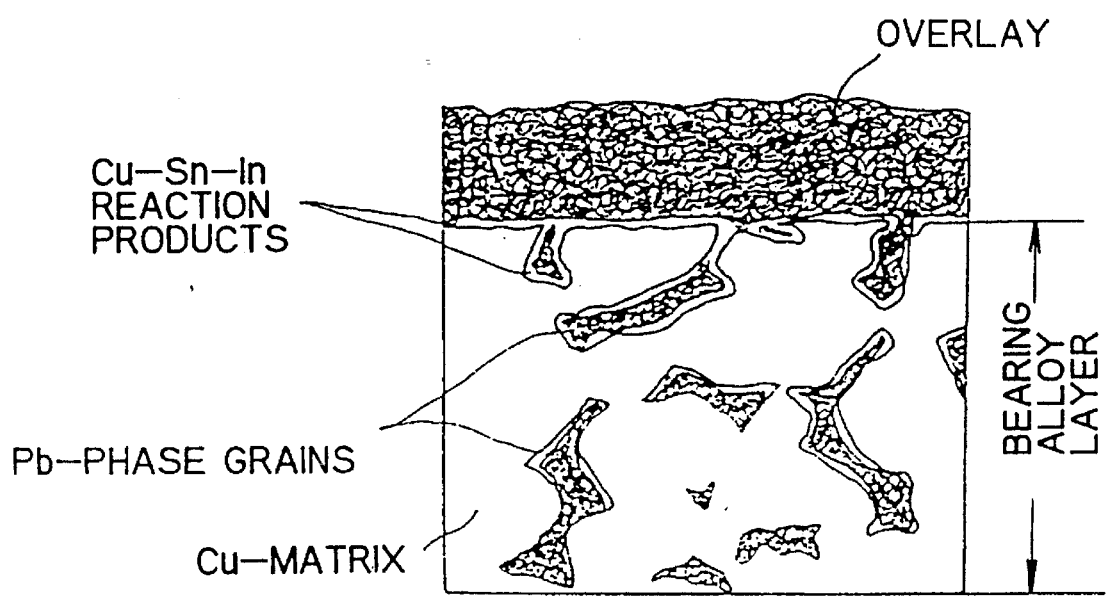
FIG. 2B is a further enlarged cross-sectional view showing one part of FIG. 2A.

FIG. 2A shows a condition of diffusion of Sn and In after diffusion treatment in an example 6 containing 15% Ni, in which Sn and In are diffused into the bearing alloy layer deeply by 100 μm from the overlay side. FIG. 2B is an enlarged view of one part of FIG. 2A, showing that Cu—Sn—In reaction products are generated only slightly. That is to say, when Sn and In in the overlay diffuse into the bearing alloy layer, generation of the Cu—Sn—In reaction products is restrained by Ni in the Cu matrix, and Sn and In are diffused and coexist in the Pb-phase grains. Moreover, an amount of consumption of In as the foregoing reaction products is so small that In diffuses deeply into the bearing alloy layer.

On the other hand, when the Ni concentration is higher, conformability as a bearing with respect to a shaft which is a sliding mating member of the bearing tends to decrease. If the Ni concentration exceeds 20%, the bearing exhibits this tendency conspicuously. Therefore, the Ni content is limited to 1 to 20%.

2) Sn: 0.5 to 8 wt %

When the Sn content is less than 0.5%, the strength of the alloy is insufficient. When it exceeds 8%, the alloy becomes excessively hard and brittle, and also, the heat conductivity is deteriorated, thereby degrading the anti-seizure property. Consequently, the Sn content is limited to 0.5 to 8 wt %.

3) Pb: 8 to 30 wt %

When the Pb content is less than 8%, the anti-seizure property is degraded. When it exceeds 30%, strength of the alloy is deteriorated. Therefore, the Pb content is limited to 8 to 30 wt %.

4) P: up to 0.2 wt %

When the P (phosphorus) content exceeds 0.2%, the alloy becomes excessively hard, and conformability with respect to a shaft decreases. Therefore, the P content is limited to not more than 0.2 wt %.

B. Overlay

1) In: 0.1 to 15 wt %

When the In content is less than 0.1%, corrosion resistance of the overlay is degraded. When it exceeds 15%, the melting point of the overlay is lowered, thereby easily causing a wiping phenomenon (a melted overlay flowing phenomenon). Consequently, the In content is limited to 0.1 to 15 wt %.

2) Sn: up to 18 wt %

When the Sn content exceeds 18%, the melting point of the overlay is lowered, thereby easily causing a wiping phenomenon (a melted overlay flowing phenomenon). Consequently, the Sn content is limited to 18 wt % or less.

3) Cu: up to 5 wt %

When the Cu content exceeds 5%, the overlay becomes hard and brittle. Therefore, the Cu content is limited to 5 wt % or less.

C. In Diffused Layer in the bearing alloy layer (30 to 200 μm from the interface between the overlay and the bearing alloy layer)

When the In diffused layer is less than 30 μm thick, the effect of corrosion resistance is insufficient. When it exceeds 200 μm thick, the In concentration in the overlay is decreased, thereby deteriorating corrosion resistance of the overlay itself. Consequently, the diffusion layer is limited to 30 to 200 μm from the interface between the overlay and the bearing alloy layer.

EXAMPLE

Invention examples will be hereinafter described with comparative examples.

Cu—Pb alloy powders having compositions of embodiments of the invention (Examples 1 to 7) shown in Table 1 were put on backing steel plates plated with copper of 8 μm thick. After the plates were put into a reducing atmosphere furnace, they were sintered at a temperature of 700 to 900° C. for 10 to 30 minutes. In order to increase the density of the alloy to obtain a predetermined strength, the plates were passed between rolls for first rolling. Further, they were sintered and rolled again, thereby obtaining bimetal plates. In substantially the same manner as the invention bimetal plates, bimetal plates of comparative examples (Comparative Examples 8 to 10) were prepared. The overall thickness of each of the bimetal plates thus obtained was 1.60 mm, and the thickness of its bearing alloy layer was 0.35 mm. Table 1 also shows alloy hardness and tensile strength of the bimetal plates.

TABLE 1

| Kind of Example | No. | Chemical Composition (Wt %) | | | | | Hardness Hv5 | Tensile strength N/mm$^2$ |
|---|---|---|---|---|---|---|---|---|
| | | Cu | Sn | Pb | Ni | P | | |
| Invention Example | 1 | Bal. | 0.5 | 25 | 2 | 0.02 | 63 | 155 |
| | 2 | Bal. | 0.5 | 25 | 6 | 0.02 | 65 | 160 |
| | 3 | Bal. | 2.0 | 22 | 2 | 0.03 | 77 | 215 |
| | 4 | Bal. | 2.0 | 22 | 6 | 0.03 | 80 | 210 |
| | 5 | Bal. | 2.0 | 22 | 12 | 0.03 | 82 | 215 |
| | 6 | Bal. | 2.0 | 22 | 15 | 0.03 | 85 | 215 |
| | 7 | Bal. | 3.0 | 22 | 18 | 0.03 | 85 | 215 |
| Comparative Example | 8 | Bal. | 0.5 | 25 | — | 0.02 | 62 | 155 |
| | 9 | Bal. | 2.0 | 22 | — | 0.03 | 75 | 210 |
| | 10 | Bal. | 4.0 | 23 | — | 0.05 | 85 | 220 |

The bimetal plates of Examples 1 to 7 and Comparative Examples 8 to 10 were cut into strips having a width of 25 mm and a length of 50 mm. Then, their alloy surfaces were finished as smooth surfaces, and copper platings on the rear surfaces were removed, thus test pieces were prepared. Thereafter, by electric plating, each of the test pieces was formed with an overlay having a composition of Pb-9% Sn-9% In-1% Cu and a thickness of 20 μm, and was subjected to diffusion treatment at a temperature of 165° C. for 1000 hours. Weight changes of Sn and In in the overlays after the diffusion treatment, and diffusion depths of Sn and In in the bearing alloy layers are shown in Table 2.

TABLE 2

| Kind of Example | No. | Remaining Amount (Wt %) | | Diffusion Depth (μm) |
|---|---|---|---|---|
| | | Sn | In | |
| Invention Example | 1 | 1.1 | 2.2 | 40 |
| | 2 | 1.2 | 2.3 | 60 |
| | 3 | 1.2 | 2.2 | 40 |
| | 4 | 1.2 | 2.3 | 70 |
| | 5 | 1.3 | 2.4 | 90 |
| | 6 | 1.4 | 2.5 | 100 |
| | 7 | 1.6 | 2.7 | 110 |
| Comparative Example | 8 | 1.1 | 2.0 | 15 |
| | 9 | 2.2 | 3.2 | 20 |
| | 10 | 1.1 | 2.1 | 20 |

Next, corrosion tests were carried out with the test pieces of Invention Examples 1 to 7 and Comparative Examples 8 to 10 after the diffusion treatment, on which overlays were formed (Overlay Formed), and the same test pieces from which overlays were removed (Overlay Removed). In a corrosion test, each test piece was immersed in lubrication oil oxidized after it had been used in a taxi for traveling 10000 km, and an amount of corrosion at 130° C. after 1000 hours was inspected. The corrosion amount was derived from a difference between weights of each test piece before and after the test which was divided by its surface area. The test results are shown in Table 3.

TABLE 3

| Kind of Example | No. | Corrosion Amount (mg/cm²) | |
| --- | --- | --- | --- |
| | | Overlayer Formed | Overlayer Removed |
| Invention Example | 1 | 0.3 | 1.8 |
| | 2 | 0.2 | 1.2 |
| | 3 | 0.3 | 1.6 |
| | 4 | 0.2 | 1.0 |
| | 5 | 0.2 | 0.5 |
| | 6 | 0.2 | 0.3 |
| | 7 | 0.2 | 0.2 |
| Comparative Example | 8 | 0.3 | 8.2 |
| | 9 | 0.1 | 4.6 |
| | 10 | 0.2 | 6.4 |

In the case where the test pieces of Invention Examples 1 to 7 and Comparative Examples 8 to 10 had overlays, their corrosion amounts did not change largely, and these test pieces exhibited the effect of corrosion resistance produced by the overlays. However, among the test pieces from which the overlays were removed, corrosion amounts of Comparative Examples 8 to 10 were remarkably increased. In contrast, the test pieces of Examples 1 to 7 were not corroded much. Especially, Examples 5 to 7 containing not less than 10% Ni exhibited almost the same amounts of corrosion as when they were formed with the overlays.

As will be apparent from the above, according to the present invention, the multi-layer bearing consists of the backing steel plate optionally plated with Cu, the Cu—Pb bearing alloy layer, and the overlay of Pb alloy including In, wherein In in the overlay is diffused into the Pb-phase grains in the bearing alloy layer and forms a diffusion layer in which In coexists with the Pb-phase grains, in an area of 30 to 200 μm from the interface between the overlay and the bearing alloy layer. Therefore, even if the overlay is worn and the bearing alloy is exposed, the diffusion layer having an excellent corrosion resistance can maintain a high corrosion resistance of the Cu—Pb alloy bearing for a long time.

What is claimed is:

1. A multi-layer Cu—Pb corrosion resistant alloy bearing consisting of a backing steel plate optionally plated with Cu, a layer of Cu—Pb bearing alloy over the backing plate, said bearing alloy layer comprising a matrix with Pb phase grains therein, said alloy layer consisting of, by weight, 1 to 20% of Ni, 0.5 to 8% of Sn, 8 to 30% of Pb, up to 0.2% P, and balance of Cu and incidental impurities, and an overlay of Pb alloy containing In, wherein In in said overlay is diffused into the Pb-phase grains in the bearing alloy layer and forms a layer in which In coexists with the Pb-phase phase grains in a high concentration of 2–10 wt %, to a depth of between 30 to 200 μm from the interface of the overlay and the bearing alloy layer.

2. A Cu—Pb alloy bearing according to claim 1, wherein said overlay over the bearing alloy layer essentially consists of, by weight, 0.1 to 15% of In, at least one element of up to 18% of Sn and up to 5% Cu, and balance of Pb and incidental impurities.

3. A multi-layer Cu—Pb corrosion resistant alloy bearing consisting of:

a backing steel plate optionally plated with Cu;

a layer of Cu—Pb bearing alloy over the backing plate, said bearing alloy layer comprising a matrix having Pb-phase grains dispersed therein, wherein said bearing alloy consists essentially of, by weight, 2 to 20% of Ni, 0.5 to 8% of Sn, 8 to 30% of Pb, P in an amount up to 0.2%, and balance of Cu and incidental impurities, and an overlay of Pb alloy containing In, wherein In in said overlay is diffused into the Pb-phase grains in the bearing alloy layer and forms a layer in which In coexists with the Pb-phase grains in a concentration of 2–10 wt %, to a depth of between 30 to 200 μm from the interface between the overlay and the bearing alloy layer.

4. A Cu—Pb alloy bearing according to claim 3, wherein said overlay over the bearing alloy layer essentially consists of, by weight, 0.1 to 15% of In, at least one element of up to 18% of Sn and up to 5% Cu, and balance of Pb and incidental impurities.

5. A multi-layer Cu—Pb corrosion resistant alloy bearing consisting of:

a backing steel plate optionally plated with Cu;

a layer of Cu—Pb bearing alloy over the backing plate, said bearing alloy layer comprising a matrix having Pb-phase grains dispersed therein, wherein said bearing alloy essentially consists of, by weight, 10–20% of Ni, 0.5 to 8% of Sn, 8 to 30% of Pb, P in an amount up to 0.2%, and balance of Cu and incidental impurities, and an overlay of Pb alloy containing In, wherein In in said overlay is diffused into the Pb-phase grains in the bearing alloy layer and forms a layer in which In coexists with the Pb-phase grains, to a depth of between 30 to 200 μm from the interface between the overlay and the bearing alloy layer.

* * * * *